United States Patent [19]
Robin et al.

[11] Patent Number: 5,173,078
[45] Date of Patent: Dec. 22, 1992

[54] HEATING AND VENTILATING APPARATUS FOR THE CABIN OF A MOTOR VEHICLE

[76] Inventors: Roger Robin, 7, Clos du Gandouget, Les Elancourtines, 78990 Elancourt; Jean-François Bouvot, 2, rue des Grands Prés, Le Mesnil-Sévin, 78720 Dampierre, both of France

[21] Appl. No.: 783,916

[22] Filed: Oct. 29, 1991

[30] Foreign Application Priority Data

Oct. 31, 1990 [FR] France ................. 90 13568

[51] Int. Cl.⁵ ............................. B60S 1/54
[52] U.S. Cl. ............................. 454/126; 454/127; 454/160
[58] Field of Search ............ 454/75, 121, 126, 127, 454/156, 159, 160

[56] References Cited

U.S. PATENT DOCUMENTS 4,223,754 3/1978 Mizuno et al. .
4,549,471 10/1985 Kochy ..................... 454/127
5,109,755 5/1992 Guillemin ................ 454/126 X

FOREIGN PATENT DOCUMENTS 0102611 8/1983 European Pat. Off. .
2655554 12/1976 Fed. Rep. of Germany .
2631287 5/1988 France .

Primary Examiner—Robert G. Nilson

[57] ABSTRACT

A heating and ventilating apparatus for a motor vehicle includes a cold air admission duct supplying the admission and heating circuit in order to produce a stream of cold or heated air for introduction into the inlet of a distribution circuit having air outlet ducts which exhaust into different parts of the cabin of the vehicle.

The apparatus includes a priority demisting duct which is separate from the distribution circuit, and which has an inlet communicating with the admission and heating circuit, together with an outlet which exhausts behind the windshield. A shut-off valve is displaced between a priority demisting position, in which it closes off the inlet of the distribution circuit, and a normal position in which it closes off the inlet of the priority demisting duct.

8 Claims, 3 Drawing Sheets

HEATING AND VENTILATING APPARATUS FOR THE CABIN OF A MOTOR VEHICLE

FIELD OF THE INVENTION

This invention relates to a heating and ventilating apparatus for the cabin of a motor vehicle.

BACKGROUND OF THE INVENTION

It is known to provide a heating and ventilating apparatus for the cabin of a motor vehicle, comprising: a cold air admission duct: an admission and heating circuit which is connected to the cold air admission duct and which is adapted to produce a flow of cold or heated air; a distribution circuit which is connected to the admission and heating circuit and which comprises an inlet for the admission of the stream of cold or heated air together with and which are adapted to distribute, via distribution means, the stream of air into different parts of the cabin, wherein at least one of the said outlet ducts exhausts behind the windshield of the vehicle for the purpose of demisting the windshield. Such an apparatus will be referred to as an apparatus of the kind specified.

Such an apparatus is commonly used for the heating and ventilation, and sometimes for the air conditioning, of the cabin of a motor vehicle, and is arranged to deliver cold or heated air into different parts of the cabin through the various outlet ducts mentioned above. There are usually three of these outlet ducts, comprising the outlet duct which feeds the windshield demisting and de-icing vents, a duct which feeds the ventilating vents at the level of the fascia, and finally a duct which leads to a vent in the lower part of the cabin. The cold air introduced from outside the cabin, or in some cases cold air introduced through an air conditioning system, is adjusted as to its temperature by the admission and heating circuit before being released into the cabin.

Such apparatus also includes, in a known manner, a motorised blower unit which is arranged upstream of the cold air admission duct, so as to regulate the speed of the air stream that is delivered into the cabin. Most apparatuses of this type include manual, mechanical or electrical control means operated by the driver, for regulating the temperature of the air stream, its distribution between the various outlet ducts, and also the flow rate of ventilating air.

Although such apparatuses generally give satisfaction, they do have certain drawbacks. For example, when the driver sees that there is misting or ice on the windshield of the vehicle, he has to operate the various controls so as to modify, all at the same time, the temperature of the air stream, its distribution mode, and its flow rate, that is to say he has to operate three different controls more or less at the same time. This leads to a risk that the driver may be distracted for too long from paying proper attention to his driving, to the detriment of safety; and this is aggravated by the fact that his visibility through the windshield is impaired. And then, once the misting or ice has been dispersed, the driver once again has to operate the same controls in order to restore the adjustment of the system to its previous state consistent with the required degree of comfort within the cabin. This again introduces the risk of undue distraction of the driver from his driving. The operations on the controls in order to effect demisting cannot be memorised on the various manual, mechanical or electrical controls, which means that, once the misting has been cleared, the driver has either to remember what the previous settings were, or to find them again by trial and error.

DISCUSSION OF THE INVENTION

A principal object of the invention is to overcome the above mentioned disadvantages. To this end, according to the invention an apparatus of the kind specified is characterised in that it includes: a demisting duct which is separate from the said distribution circuit, and which constitutes a priority demisting duct having an inlet communicating with the admission and heating circuit, together with an outlet which exhausts behind the windshield; a first shut-off valve which is displaceable between a priority demisting position, in which it covers the inlet of the distribution circuit, and a normal position in which it covers the inlet of the priority demisting duct; and control means for controlling the displacement of the said shut-off valve between the two said positions thereof.

With this arrangement, in the normal position of the first shut-off valve, the cold or heated air stream is distributed between the outlet ducts of the distribution circuit through the distribution means, while the priority demisting duct is rendered totally inoperative. In the priority demisting position, on the other hand, the cold or heated air stream flows through the priority demisting duct on to the rear surface of the windshield, while the distribution circuit is rendered inoperative.

When the first shut-off valve is in the priority demisting position, the various settings of the apparatus for its normal operation are not lost, and particularly the settings of the distribution means. In consequence, when the windshield has been properly demisted or de-iced, and the first shut-off valve is returned to its normal position, the normal settings of the apparatus are themselves restored.

It should be noted that in this specification, the term "demisting" means any action such as to deliver air (preferably heated) to the rear surface of the windshield of the vehicle in order to effect demisting and/or de-icing of the latter.

In a first embodiment of the apparatus, the admission and heating circuit includes: a cold air transmission branch which is interposed between the cold air admission duct and the inlet of the distribution circuit; an air heating branch which is interposed between the cold air admission duct and the inlet of the distribution circuit, with a heat exchanger being arranged in the said air heating branch; and a mixing valve which is adapted to vary the distribution of the air stream between the two said branches. In this embodiment, the apparatus of the invention further includes an auxiliary cold air admission port which exhausts directly into the air heating branch upstream of the heat exchanger, together with an auxiliary shut-off valve which is displaceable between a closed position, in which it closes the said auxiliary port, and an open position in which the said auxiliary admission port is open.

Preferably, the auxiliary shut-off valve is displaceable in synchronism with the said first shut-off valve, in such a way that when the first shut-off valve is in its priority demisting position, the auxiliary shut-off valve is open, and when the first shut-off valve is in its normal position, the auxiliary shut-off valve is closed.

In a second embodiment of an apparatus according to the invention, the admission and heating circuit includes a single admission branch which is interposed between the cold air admission duct and the inlet of the distribution circuit, with a heat exchanger being disposed in the said admission branch, the said heat exchanger being arranged to be supplied with a heat transfer fluid through a flow regulating device. In this second embodiment, the apparatus further includes control means for controlling the said flow regulating device, the said control means being synchronised with further control means for controlling the displacement of the first shut-off valve, in such a way that the flow of the heat transfer fluid through the heat exchanger is increased or maintained at its maximum value when the said first shut-off valve is in its priority demisting position.

In a third embodiment of the apparatus, the admission and heating circuit includes a cold air transmission branch which is controlled by a flow regulating valve, and a heating branch containing a heat exchanger which is supplied with a heat transfer fluid through a flow regulating device, the two said branches being interposed between, firstly, the cold air admission duct and secondly, the air inlet of the distribution circuit and the air inlet of the demisting duct.

In accordance with the invention, the apparatus further includes control means for the flow regulating valve of the cold air stream, these control means being synchronised with the control means of the first shut-off valve, in such a way that the cold air flow regulating valve closes the cold air transmission branch when the first shut-off valve is in its priority demisting position.

According to another preferred feature of the invention, the apparatus includes a sensor for detecting the presence, actual or imminent, of misting or ice on the windshield. This sensor may be arranged to indicate to the driver, for example by means of a visual signal, that misting or ice is forming or is about to form on the back of the windshield. The driver can then touch a control which automatically actuates the control means of the apparatus so as to put the latter in its priority demisting mode. In a modification, the driver is able to move a lever into the priority demisting position.

In a more sophisticated form of apparatus in accordance with the invention, the sensor is connected to an electronic module, for controlling the first shut-off valve and also any other control means that may be synchronised with the latter. Thus, where the apparatus includes an air blower for delivering cold air through the air admission duct, the electronic module is arranged to increase the speed of the blower to an optimum (for example a maximum) value when the first shut-off valve is in its priority demisting position.

In all the various embodiments of the invention, the air admission duct is preferably connected to an air inlet port which is controlled by an air inlet valve, the latter being displaceable between an open and a closed position in which the air inlet port is open and closed respectively. With this arrangement, according to a preferred feature of the invention, the apparatus further includes inlet valve control means for controlling the air inlet valve, the inlet valve control means being synchronised with the control means for the said first shut-off valve, in such a way that the air inlet valve is always in the open position when the first shut-off valve is in its priority demisting position.

The description of preferred embodiments of the invention, which follows, is given by way of example only and with reference to the accompanying drawings.

DESCRIPTION OF PREFERRED
EMBODIMENTS OF THE INVENTION

Figure 1:
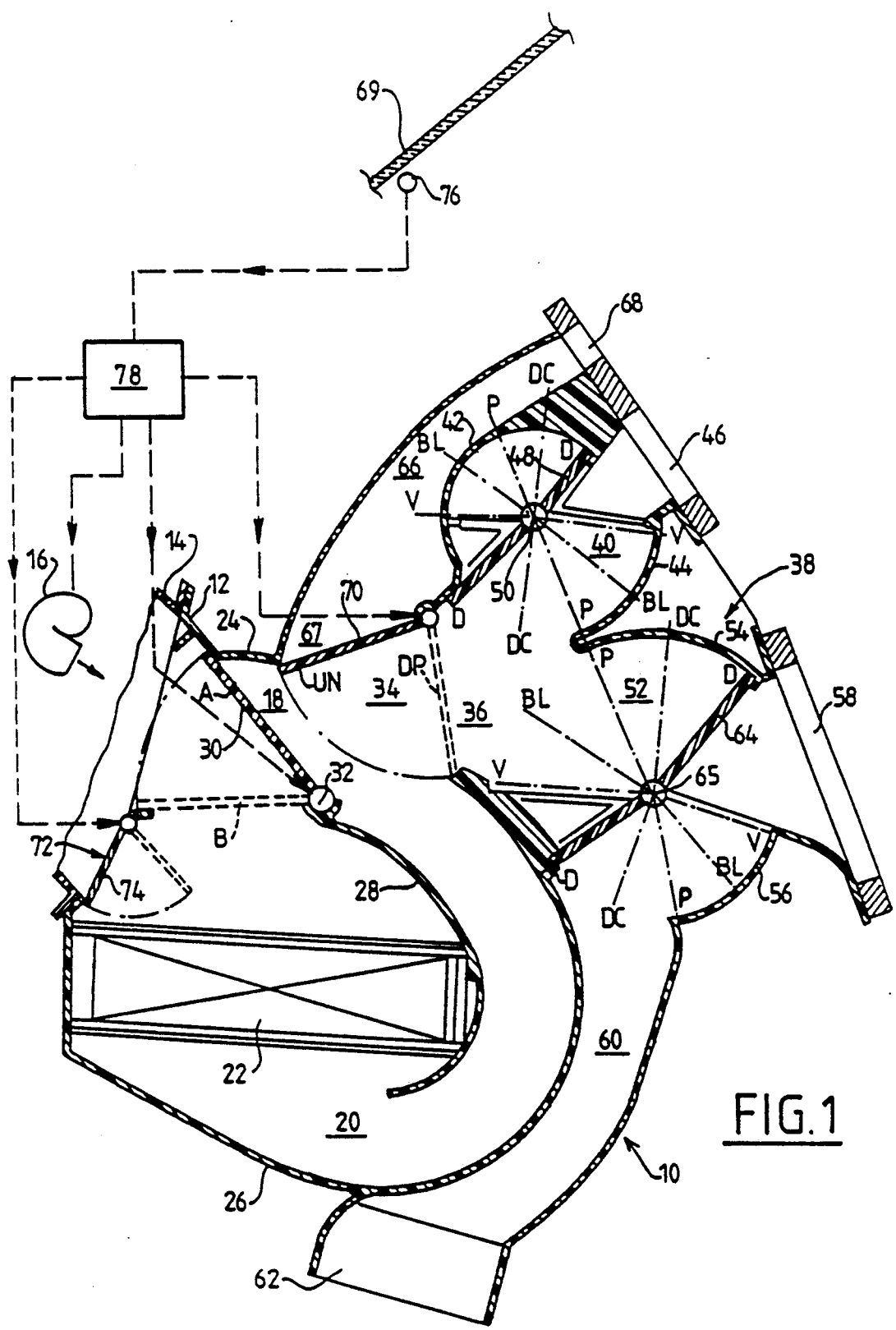
FIG. 1 is a view in cross section showing an apparatus in accordance with the invention in the first embodiment mentioned above.

The apparatus shown in FIG. 1 comprises a housing 10 which includes a cold air admission duct 12, which is connected to the delivery port 14 of a motorised blower unit (not shown) which includes a blower 16. The blower 16 is arranged to deliver into the admission duct 12 cold air from outside the cabin of the vehicle. This air may in appropriate cases have passed through an air conditioning unit.

The admission duct 12 is connected to an admission and heating circuit comprising a cold air transmission branch 18 and a heating branch 20. The latter is generally U-shaped on one side and contains a heat exchanger 22, which is supplied at all times with a heat transfer fluid, typically the coolant fluid of the engine of the vehicle. The branch 18 terminates at its downstream end in a wall portion 24, while the branch 20 is bounded externally by an inwardly curved wall portion 26. The branch 20 is thus in the form of a kind of pocket, in which an internal wall 28 is arranged so as to give a U-shaped fluid flow within the branch 20. The cold air transmission branch 18 extends directly between the two ends of the U-shaped heating branch 20.

The apparatus also includes a mixing valve 30 which is mounted on, and for rotation, about a pivot 32, and which is disposed at the junction of the admission duct 12 with the branches 18 and 20. The purpose of the mixing valve 30 is to permit the distribution between the two branches 18 and 20 of the air flow which is delivered through the admission duct 12, thereby controlling the temperature of the air at the outlet ends of the branches 18 and 20. The mixing valve 30 is displaceable between a position A (shown in full lines) and a position B (shown in broken lines). In the position A of the valve, the air flows only in the air heating branch 20, while in the position B air flows only through the cold air transmission branch 18. The mixing valve 30 is of course able to occupy any position intermediate between the two positions A and B. At their outlet ends, the branches 18 and 20 communicate with each other through a mixing zone 34, in which the cold air coming from the branch 18 is enabled to mix with the warm air coming from the branch 20. The flow of cold or heated air, which is thus obtained at the outlet of the admission and heating circuit, is then able to pass to the inlet 36 of a distribution circuit 38.

The circuit 38 includes a first outlet duct 40, which is mainly delimited by two cylindrical wall portions 42 and 44, and which leads to at least one demisting/de-icing vent 46 for delivering cold or heated air behind the windshield 69 of the vehicle. The air distribution through the duct 40 is controlled by a distribution valve 48, which is mounted for rotation about an axis 50.

The circuit 38 also includes a second outlet duct 52 and a third outlet duct 60. The second outlet duct 52 is mainly delimited by two cylindrical wall portions 54 and 56, and exhausts through at least one ventilating air vent 58 which is arranged at the level of the fascia of the vehicle. The outlet duct 60 exhausts through an outlet vent 62 in the lower part of the cabin of the vehicle.

A second distribuion valve 64 is mounted on, and for rotation about, a pivot 65, and is arranged to control the distribution of air through the outlet ducts 52 and 60. The valves 48 and 64 are synchronised with each other, in such a way as to be able to adopt five different positions. In FIG. 1, these positions are identified, respectively, by the reference symbols V (ventilation), BL (bi-level, i.e. with a stratified temperature pattern), P (warming of the feet of the occupants of the vehicle), DC (demisting and de-icing), and D (de-icing only).

As described up to this point, the structure of the apparatus is of a generally known kind. However, the apparatus also includes a demisting duct 66, otherwise referred to as a priority demisting duct. This duct 66 is separate from the distribution circuit 38, and has an inlet 67 which communicates with the admission and heating circuit 18, 20. More particularly, the inlet 67 communicates with the mixing zone 34 of the latter. The outlet 68 of the duct 66 exhausts behind the windshield 69, close to the demisting and de-icing vent 46.

In addition, the apparatus further includes a first or main shut-off valve 70, which is displaceable between a first position indicated at DP in broken lines, and a second position UN shown in full lines. The position DP is referred to as the priority demisting position or priority de-icing position. In this position, the shut-off valve 70 covers the inlet 36 of the distribution circuit 38, while in the position UN, referred to as the normal position of the valve 70, it covers the inlet 67 of the priority demisting duct 66. Displacement of the shut-off valve 70 between these two positions DP and UN can be effected by means of any suitable actuating means (not shown). This actuating means may be manual, or operated through a suitable mechanical linkage or by electrical means such as a micro motor. Thus, in the normal position UN, the cold or heated air flow passes through the inlet 36 of the distribution circuit, and can then be distributed between the various outlet ducts 40, 52, 60 by suitable adjustment of the two distribution valves 48 and 64.

When the windshield 69 is to be demisted or de-iced, the valve 70 is operated so as to bring it into the priority de-icing position DP, so that the air flow is then led directly to the inside surface of the windshield through the duct 66, without there being any need to adjust the distribution valves 48 and 64.

In addition to the foregoing, the apparatus shown in FIG. 1 includes an auxiliary cold air admission port 72, which is adjacent to the admission duct 12 and which exhausts directly into the air heating branch 20 upstream of the heat exchanger 22. An auxiliary shut-off valve 74 is mounted in the port 72, and is displaceable between a shutoff position shown in full lines, in which it closes off the auxiliary cold air admission port 72, and an open position shown in broken lines in which it does not close off this port. The auxiliary shut-off valve 74 is arranged to be operated in synchronism with the shut-off valve 70, in such a way that the valve 74 is in the open position when the valve 70 is in its priority demisting position DP, with the auxiliary shut-off valve 74 being in its closed position when the valve 70 is in its normal position UN. This synchronisation between the two shut-off valves 70 and 74 can be obtained using any suitable known type of adjustment of these two valves can be carried out manually, or, again, by means of a micro motor.

The particular embodiment of the apparatus shown in FIG. 1 also includes a sensor 76 which is arranged behind the windshield 69 for detecting the presence or the imminent presence of misting or ice on the rear face of the windshield. This sensor 69 is connected to an electronic module 78, which is arranged to control the synchronised displacement of the shut-off valves 70 and 74. It is also arranged, if necessary, to control the air blower 16, so as to increase its speed.

In normal operation, the main shut-off valve 70 closes the inlet 67 of the priority demisting duct 66, while the auxiliary shut-off valve 74 closes the auxiliary cold air admission port 72. The temperature of the air flowing into the distribution circuit is adjusted by means of the mixing valve 30, while the subsequent distribution of this air flow is governed by the distribution valves 48 and 64.

However, if the sensor 76 detects the actual presence of misting or ice on the rear of the windshield 69 (or detects that the conditions are such that misting or ice is about to form), the module 78 acts on the shut-off valves 70 and 74 so as to move them into a priority demisting mode. In this mode the shut-off valve 70 is in the position DP, closing off the distribution circuit inlet 36, while the valve 74 is in its open position so that the auxiliary cold air admission port 72 is open. In this way, all the heated air is channeled into the priority demisting duct 66. Regardless of the position of the mixing valve 30, however, air still passes into the heating branch 20 via the auxiliary admission port 72. The electronic module 78 is preferably arranged in such a way that the speed of the air blower 16 is then increased, with its initial speed being retained in a memory of the module 78.

Figure 2:
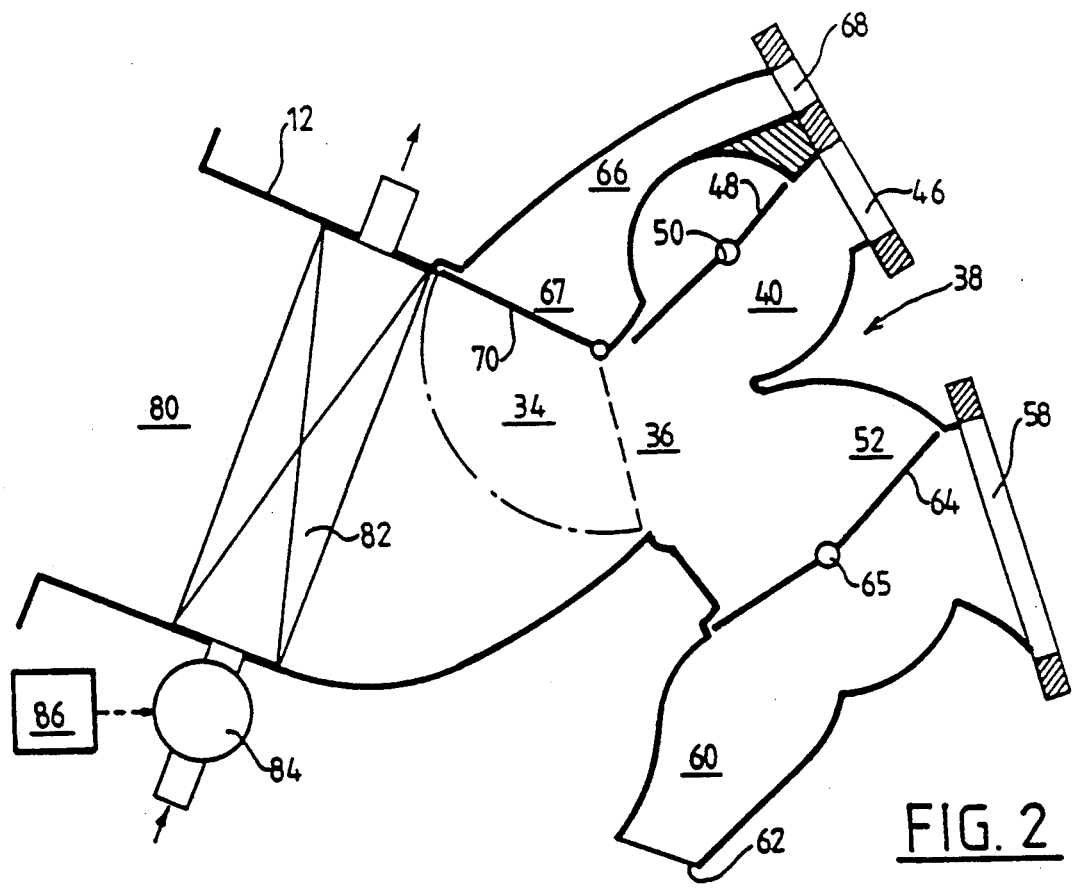
FIG. 2 is a view in cross section of an apparatus in accordance with the invention in the second embodiment mentioned above.

Reference is now made to the second embodiment shown in FIG. 2. This differs from that shown in FIG. 1 only in respect of the structure of the admission and heating circuit. Thus, in FIG. 2 this circuit has a single admission branch 80, which is interposed between the cold air admission duct 12 and the mixing zone 34, which is open both via the inlet 36 of the distribution circuit 38 and through the inlet 67 of the demisting duct 66.

The admission branch 80 contains a heat exchanger 82, which is supplied with a heat transfer fluid (for example the coolant fluid of the engine of the vehicle), through a flow regulating device 84 such as an electric valve. According to the adjustment of the device 84, the air flow with which the circuit 38 or the duct 64 is supplied is temperature controlled. The apparatus also includes control means 86 for the flow regulator 84. These control means 86 are synchronised with the means for controlling the displacement of the shut-off valve 70, in such a way that the rate of flow of the heat transfer fluid through the heat exchanger 82 is increased or maintained at its maximum demisting position (shown in broken lines in FIG. 2). The control means 86 are for example controlled by the electronic module 78 of FIG. 1 (not shown in FIG. 2), which is arranged to retain in its memory the initial state of the control means 86.

Figure 3:
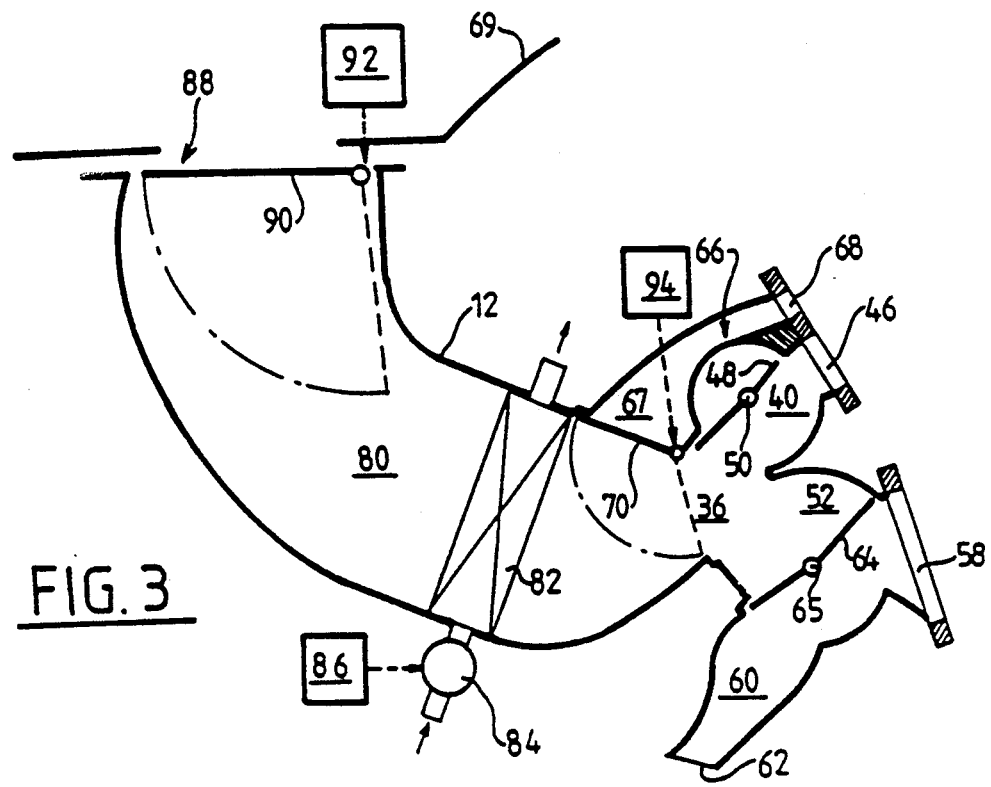
FIG. 3 is a view in cross section showing an installation whcih includes an apparatus of the kind shown in FIG. 2.

As can be seen in FIG. 3, the air admission duct 12 is connected to an air inlet port 88 controlled by an air inlet valve 90, which is displaceable between a closed position shown in full lines, in which the port 88 is closed, and an open position shown in broken lines in which the port 88 is open. The port 88 is formed through a suitable part of the bodywork of the motor vehicle, and enables the apparatus to be supplied with fresh air drawn from outside the cabin of the vehicle.

Also shown in FIG. 3 is a control means 92 for controlling the air inlet valve 90. The control means 92 are synchronised with the control means for the shut-off valve 70. In FIG. 3 these control means are indicated at 94, and this synchronisation is so arranged that the air inlet valve 90 must be open when the shut-off valve 70 is in its priority demisting position, here indicated in broken lines. Preferably, the control means 92 and 94 are also synchronised with the control means 86 for the flow regulator valve 84. Thus, in the priority demisting position, the device 84 is so adjusted that the heat transfer fluid which passes through the heat exchanger 82 will be at an elevated temperature, or at a temperature which is maintained at its maximum value.

Figure 4:
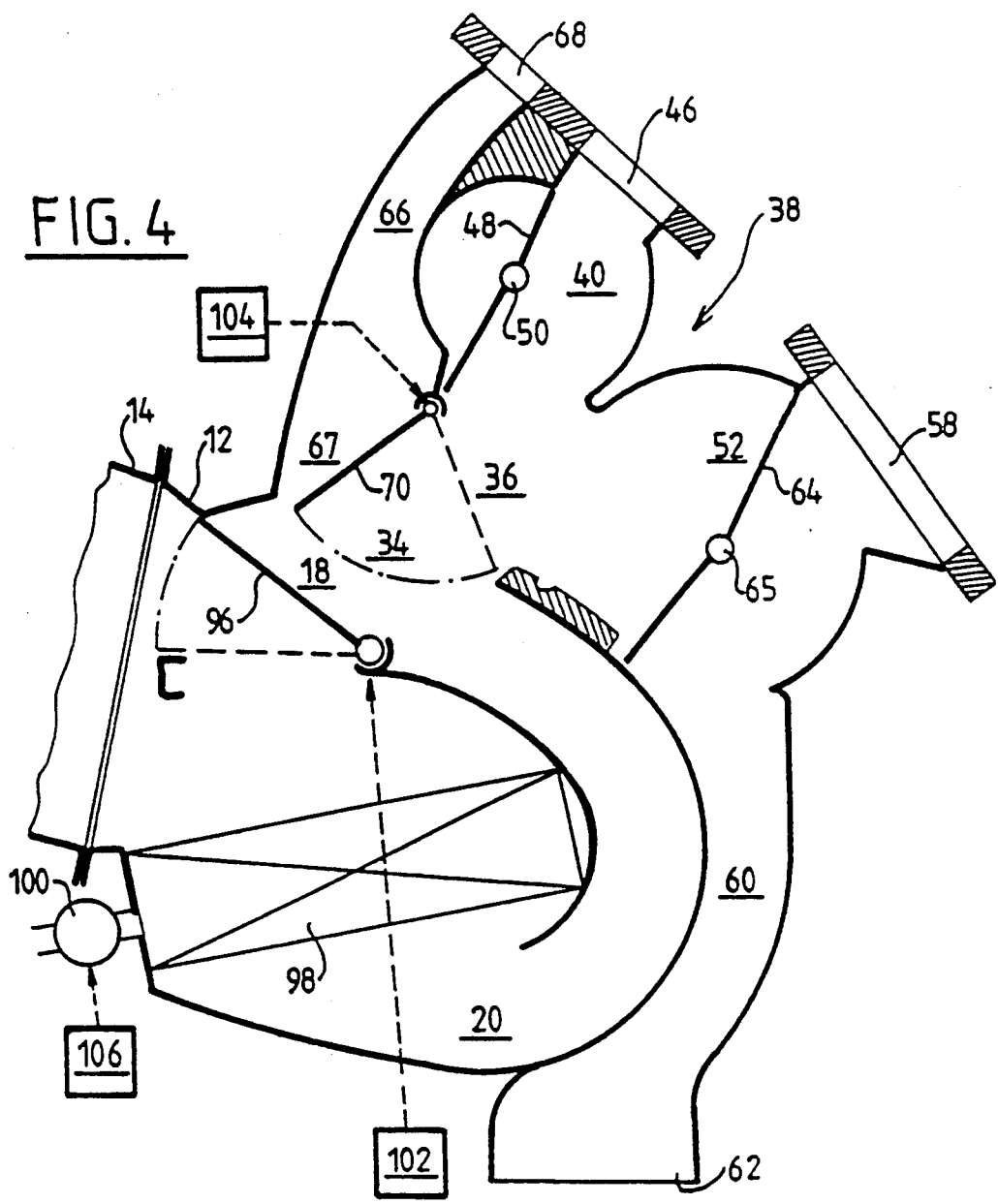
FIG. 4 is a view in cross section showing an apparatus in accordance with the invention in the third embodiment mentioned above.

Reference is now made to FIG. 4, which shows a third embodiment of the apparatus that differs from that shown in FIG. 1 in respect of the structure of the admission and heating circuit. In FIG. 4, the admission and heating circuit has a cold air transmission branch 18 which is controlled by a flow regulating valve 96, together with an air heating branch 20 which contains a heat exchanger 98. The heat exchanger 98 is supplied with a heat transfer fluid through a flow regulating device 100. The branches 18 and 20 are connected firstly to the admission duct 12, and secondly to the mixing zone 34, which is again open into the inlet 36 of the distribution circuit 38 and the inlet 67 of the priority demisting branch 66. Control means 102 are provided for controlling the cold air regulating valve 96, and a further control means 104 is provided for controlling the shut-off valve 70.

The control means 104 are preferably synchronised with the control means 106 for the flow regulating device 100, so that in the priority demisting position, the temperature in the heat transfer fluid passing through the heat exchanger 98 will be increased or retained at its maximum value.

In all of the embodiments described above, it is possible to use, in the manner described with reference to FIG. 1, a sensor which is located behind the windshield in order to detect the presence, actual or imminent, of misting on the rear face of the windshield, and to control automatically the displacement of the main shut-off valve 70 into its priority demisting position. In further embodiments, this sensor may simply be arranged to illuminate a visual indicator, in order to indicate to the driver that he should operate the appropriate control to put the system into its priority demisting mode. This control may for example consist of a suitable manual control, or a control such as a switch acting on micro motors, which are then arranged to control the various adjusting devices in the apparatus. It should be noted that (as has already been indicated), in the priority demisting position the blower 16 is arranged to operate at an increased speed.

Figure 5:
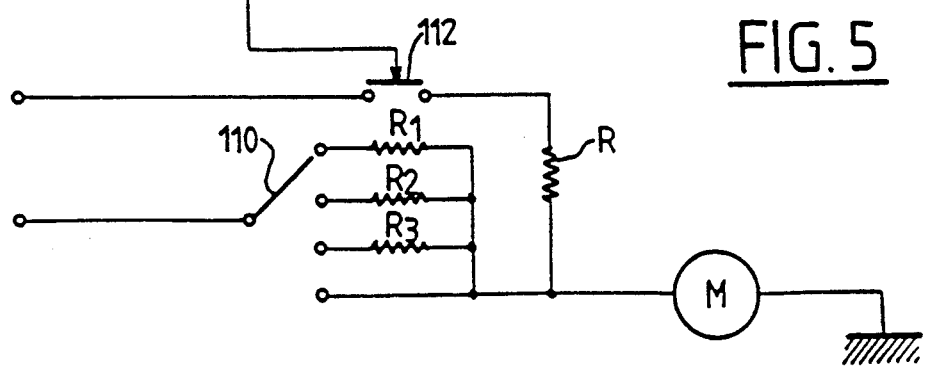
FIG. 5 shows, in diagrammatic form, a control circuit for an air blower which is adapted to form part of an apparatus in accordance with the invention.

Referring now to FIG. 5, the air blower includes an electric motor M, which is arranged to operate at four different speeds, being supplied with current either directly or via three resistors R1, R2 and R3 having different values, which are selectively brought into circuit by means of a variable resistor 110. The sensor 76 can then cause the speed of the motor to be increased or maintained at its maximum value, by acting on a contactor 112 so as to bring the motor into circuit with a resistance R of an appropriate value.

The electronic module 78 which is associated with the sensor 76 can be arranged, using known techniques, to carry out the following operations:

To increase the speed of the air blower or to maintain it at its maximum value;

To act on the servo units (motors with reduction gearing) by which the or each of the adjustable valves of the apparatus are controlled, in order to actuate these valves selectively;

To act on the electrical valve of the flow regulator for the heat exchanger (in the case where the heat exchanger is of the faucet type), so as to increase the flow of the heat transfer fluid; and To act on the flow of input air into the apparatus by means of an electric valve, if a recycling valve is provided.

What is claimed is:

1. Heating and ventilating apparatus for the cabin of a motor vehicle having a windshield with a rear surface, wherein the apparatus comprises: an air inlet duct; an admission and heating circuit connected to the cold air admission duct for producing a stream of cold or heated air; a distribution circuit connected to the admission and heating circuit and having an inlet for the introduction of the cold or heated air stream, a plurality of air outlet ducts, and distribution means arranged between the said inlet of the distribution circuit and the said air outlet ducts thereof for distributing the said air stream into different parts of the cabin of the vehicle, with at least one of the said outlet ducts being open adjacent to the rear surface of the windshield for demisting the latter, and wherein the apparatus further includes: a priority demisting duct separate from the said distribution circuit, the priority demisting duct having an inlet communicating with the admission and heating circuit, together with an outlet disposed adjacent to the rear surface of the windshield; a first shut-off valve; means mounting the first shut-off valve for displacement of the latter between a priority demisting position closing the said inlet of the distribution circuit, and a normal position closing the inlet of the priority demisting duct; and control means operatively connected with the first shut-off valve, for controlling the displacement of the latter.

2. Apparatus according to claim 1, wherein the said admission and heating circuit includes a cold air transmission branch interposed between the cold air circuit; an air heating branch interposed between the cold air admission duct and the inlet of the distribution circuit; a heat exchanger in the air heating branch; a mixing valve at the downstream end of the two said branches, for varying the distribution between the two said branches of the air stream; an auxiliary cold air admission port opening directly into the air heating branch upstream of the heat exchanger; an auxiliary shut-off valve associated with the auxiliary cold air admission port; and means mounting the auxiliary shut-off valve for movement of the latter between a closed position closing the said auxiliary port and an open position in which the auxiliary port is open.

3. Apparatus according to claim 2, further including means synchronising the said first shut-off valve with the said auxiliary shut-off valve whereby the latter is open when the first shut-off valve is in its priority demisting position, and closed when the first shut-off valve is in its normal position.

4. Apparatus according to claim 1, wherein the admission and heating circuit has a single admission branch interposed between the cold air admission duct and the inlet of the distribution circuit, the apparatus further including: a heat exchanger in the admission branch; means for supplying the heat exchanger with a heat transfer fluid; flow regulating means in the said supply means for regulating the flow of said fluid in the heat exchanger; control means coupled with the said flow regulating means for controlling the latter; and synchronising means synchronising the said control means of the flow regulating means with the control means of the first shut-off valve, whereby the flow of a said heat transfer fluid through the heat exchanger is increased or maintained at its maximum value when the first shut-off valve is in its priority demisting position.

5. Apparatus according to claim 1, further including a sensor for detecting the actual or imminent presence of misting on the rear surface of the windshield, and means for controlling the position of at least the said first shut-off valve in response to signals from the said sensor.

6. Apparatus according to claim 5, wherein the means responsive to the said sensor for controlling at least the first shut-off valve comprise an electronic module.

7. Apparatus according to claim 6, further including an air blower for delivering cold air through the said admission duct, the said electronic module being connected with the air blower and being adapted to control the speed of the latter at an increased value, or to maintain it at its maximum value, when the first shut-off valve is in its priority demisting position.

8. Apparatus according to claim 1, having an air inlet port connected to the air admission duct, an air inlet valve associated with the air inlet port, means mounting the air inlet valve for displacement between a closed position closing the air inlet port and an open position in which the latter is open, air inlet valve control means connected to the air inlet valve for controlling its displacement between the said positions, and means synchronising the control means of the air inlet valve and the control means of the first shut-off valve whereby to ensure that the air inlet valve is open when the first shut-off valve is in its priority demisting position.

* * * * *

UNITED STATES PATENT AND TRADEMARK OFFICE
CERTIFICATE OF CORRECTION

PATENT NO. : 5,173,078
DATED : December 22, 1992
INVENTOR(S) : Robin, et al

It is certified that error appears in the above-indentified patent and that said Letters Patent is hereby corrected as shown below:

Column 8, line 55, insert after "air" —admission duct and the said inlet of the distribution—.

On the title page, after Item [76]: Inventor, insert "[73] Assignee: Valeo Thermique Habitacle, Le Mesnil-Saint-Denis, France—.

Signed and Sealed this

Twenty-third Day of November, 1993

Attest:

BRUCE LEHMAN

Attesting Officer

Commissioner of Patents and Trademarks